US008380136B2

(12) United States Patent
Nast et al.

(10) Patent No.: US 8,380,136 B2
(45) Date of Patent: Feb. 19, 2013

(54) MODULAR CIRCUIT ARRANGEMENT USED FOR ATTENUATION COMPENSATION

(75) Inventors: Helmut Nast, Berlin (DE); Raimo Jacobi, Berlin (DE); Frank Heyder, Berlin (DE)

(73) Assignee: Funkwerk Dabendorf GmbH, Dabendorf (DE)

( * ) Notice: Subject to any disclaimer, the term of this patent is extended or adjusted under 35 U.S.C. 154(b) by 205 days.

(21) Appl. No.: 12/449,207

(22) PCT Filed: Jan. 26, 2008

(86) PCT No.: PCT/DE2008/000170
§ 371 (c)(1),
(2), (4) Date: Jun. 17, 2010

(87) PCT Pub. No.: WO2008/089755

PCT Pub. Date: Jul. 31, 2008

(65) Prior Publication Data

US 2010/0291915 A1 Nov. 18, 2010

(30) Foreign Application Priority Data

Jan. 26, 2007 (DE) ........................ 10 2007 004 911

(51) Int. Cl.
*H04B 1/38* (2006.01)

(52) U.S. Cl. ........................................... 455/73; 455/78

(58) Field of Classification Search .................... 455/73, 455/10, 13.3, 504, 506, 63.1, 63.3, 88, 550.1; 370/267; 375/219, 345
See application file for complete search history.

(56) References Cited

U.S. PATENT DOCUMENTS

| | | | |
|---|---|---|---|
| 6,972,622 B2 | 12/2005 | Jackson et al. | |
| 2006/0141944 A1 * | 6/2006 | Shibagaki et al. | 455/78 |

FOREIGN PATENT DOCUMENTS

| | | |
|---|---|---|
| DE | 195 36 640 A1 | 3/1997 |
| DE | 199 13 064 C1 | 1/2001 |
| DE | 199 83 968 T1 | 8/2002 |
| DE | 101 14 532 A1 | 10/2002 |
| DE | 696 30 348 T2 | 5/2004 |
| DE | 103 36 292 A1 | 2/2005 |
| DE | 10 2005 058 459 A1 | 6/2006 |

(Continued)

*Primary Examiner* — Lana N Le
*Assistant Examiner* — Golam Sorowar
(74) *Attorney, Agent, or Firm* — Kriegsman & Kriegsman

(57) ABSTRACT

The invention relates to a multi-band, multi-part circuit arrangement for compensating the attenuation of HF wireless signals in the signal paths between a transmitting and receiving device and an external antenna. The circuit arrangement comprises power amplifiers, receiving amplifiers, at least one splitter, at least one combiner, duplexers and frequency and/or band filters, HF switching means as well as a detector circuit for the detection of transmission signals from the transmitting and receiving device and for providing control signals for the HF switching means. It consists of a universal front-end module with HF switching means disposed on the antenna side for switching the signal paths on the antenna side, a broadband receiving amplifier and at least one splitter dividing the output signal of the receiving amplifier to several outputs of the front-end module, as well as a universal back-end module with HF switching means which is disposed on the device side and which is coupled with the transmitting and receiving device via the detector circuit for switching the signal paths on the device side, at least one receiving amplifier and at least one combiner, bringing together the input signals of several inputs of the back-end module. The front-end and the back-end modules can be combined and wired differently with various power amplifiers and different frequency and/or band filters.

15 Claims, 9 Drawing Sheets

FOREIGN PATENT DOCUMENTS

Figure 1:
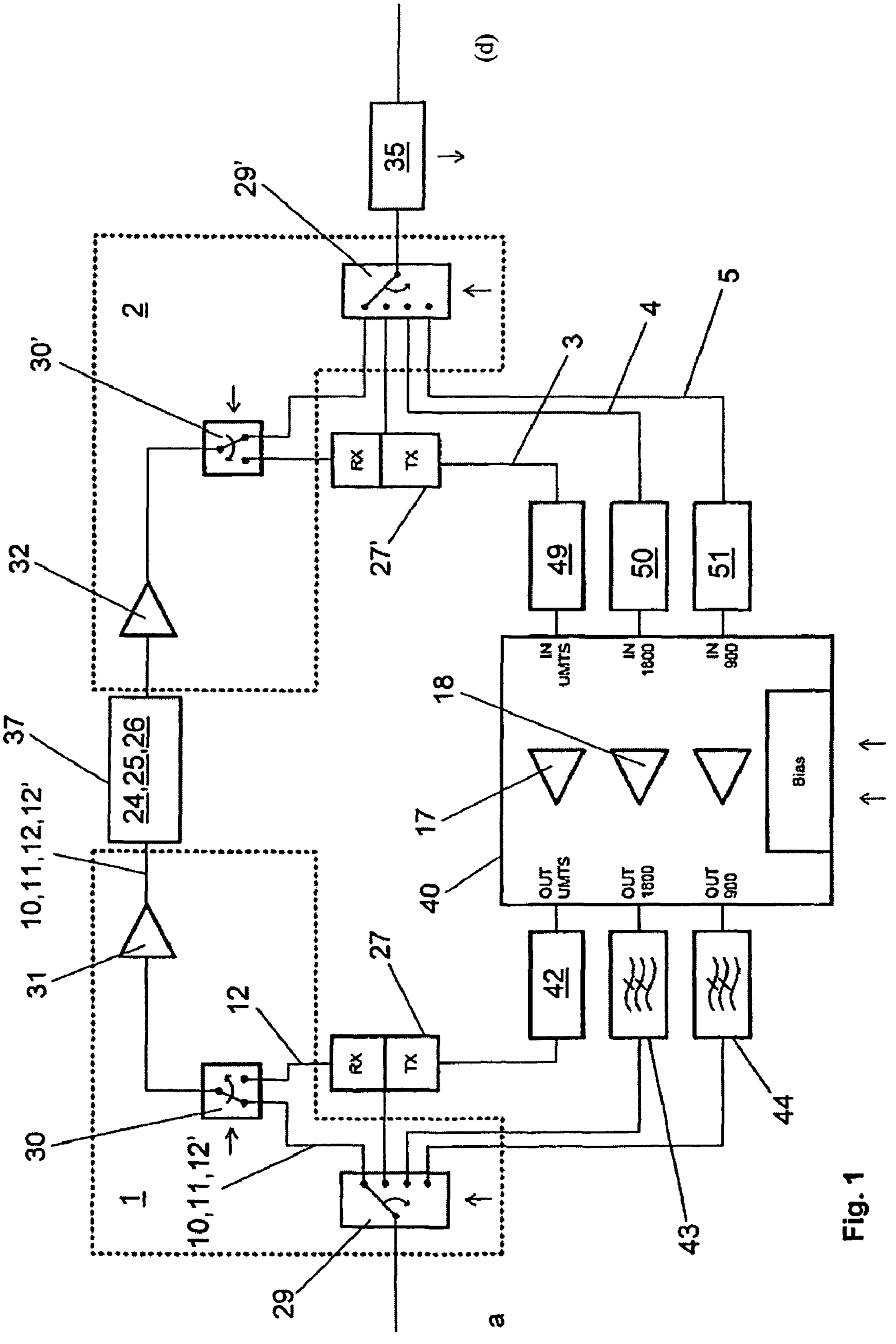

| | | | |
|---|---|---|---|
| DE | 60 2005 000 437 | T2 | 10/2007 |
| EP | 0 845 871 | A2 | 6/1998 |
| EP | 1 376 741 | B1 | 9/2006 |
| EP | 1 841 083 | A2 | 10/2007 |
| JP | 2002-325049 | A | 11/2002 |
| JP | 2004-147004 | A | 5/2004 |
| JP | 2005-229437 | A | 8/2005 |
| RU | 65 323 | U1 | 7/2007 |
| WO | WO 02/078202 | A1 | 10/2002 |
| WO | WO 2004/082162 | A1 | 9/2004 |

* cited by examiner

MODULAR CIRCUIT ARRANGEMENT USED FOR ATTENUATION COMPENSATION

The invention relates to a multi-band circuit arrangement that is constructed at least partially modular and thus is a multi-part circuit arrangement for compensation of attenuation, to which incoming and outgoing HF wireless signals are subjected in signal paths between a transmitting and receiving device and an external antenna utilized with this transmitting and receiving device. It relates preferably, but not exclusively, to a circuit arrangement provided at an external antenna for the operation of mobile transmitting and receiving devices, in particular, mobile wireless devices.

For example, in motor vehicles, mobile wireless devices are connected to an antenna accommodated externally on the vehicle, in order to avoid electromagnetic fields in the passenger compartment, for connection to a hands-free device via an HF cable (antenna lead) and optionally via an electromagnetic coupler or a capacitive or inductive coupler. In this way, signals that arrive at the external antenna, as well as signals that are emitted from the mobile wireless device via the antenna, are subjected to an undesired attenuation in the HF cable and the optionally present coupler, an attenuation that is preferably compensated by means of a special circuit arrangement to be disposed between the antenna and the transmitting and receiving device. These types of circuit arrangements are already known in various embodiments.

Thus, for example, DE 195 36 640 A1 discloses a corresponding circuit arrangement designed for GSM mobile wireless, but of course this is not a multi-band arrangement. The circuit arrangement has a receiving branch with a low-noise receiving amplifier and a transmitting branch with a power amplifier, wherein the signal path is guided via the transmitting branch if a transmission signal is present from a mobile wireless device operated on the circuit arrangement, which is recognized by a detector circuit, and in the absence of a transmission signal, is guided via the receiving branch. The signal path is switched over by means of special HF two-way switches. Alternating on and off switching is also conducted in the circuit arrangement described in the publication, as a function of the presence of a transmission signal of the receiving amplifier and the power amplifier. This particularly serves for reducing power consumption, especially with respect to the power amplifier, which must always be turned on within a time frame comprising several time slots of equal length only for the duration of the transmission time slot(s) by this measure based on the time slot-controlled signal transmission of the GSM method.

A similar circuit arrangement for a dual-band operation is described by DE 199 13 064 C1, which is conceived preferably for operation according to mobile wireless devices operating on the GSM-900 and DCS standard or the GSM-1800 standard. The circuit arrangement accordingly has signal branches for two different frequency bands, each of which has a transmitting branch and a receiving branch. The circuit components for the two frequency bands are decoupled from one another by a diplexer on the antenna side as well as on the side of the mobile device. The signal path is reversed within each of the circuit components as a function of the detection of a transmission signal, in turn, by means of HF two-way switches. In addition, a special circuit mode is provided also for this circuit arrangement, according to which, the transmitting and receiving amplifiers are alternately switched on and off. The circuit arrangement is designed in such way that, in the case of a transmission signal detected for the frequency band of a circuit component, not only is the receiving amplifier turned off in the affected circuit component, but the receiving amplifier of the other circuit component is also turned off. This prevents part of the transmission signal from reaching the receiving amplifier of the other circuit component, which would otherwise be turned on via the diplexer having a finite cross-talk attenuation and thus producing harmonics on it, which additionally would be radiated via the antenna and thus would influence the actual transmission signal in an undesired and impermissible manner.

Further a conceptually similar circuit arrangement is known from EP 137 11 44 B1, by means of which, the alternative operation of devices operating according to the GSM-900 standard, the DCS standard or the UMTS standard can be driven on a hands-free device and thus an external antenna. In addition, with this circuit arrangement, a special switching mode is provided for switching the signal paths and for turning the power and receiving amplifiers on and off.

Each of the above-named circuit arrangements, however, is designed for specific cases of application. The circuit arrangements are not variable nor are they universally applicable, so that individual special solutions must be provided for wireless standards used in other countries, for example, in the USA. The same holds true with respect to data transmission or a possible expansion of the functionality, for example, for using the WLAN or WiMAX standards and for utilizing a corresponding circuit arrangement with devices operating according to these standards.

On the other hand, for reasons of cost, it is not practical to provide a circuit arrangement that can be used equally for all of the above-named wireless standards and data transmission systems. In particular, such a circuit arrangement would be much too expensive with respect to the multiple numbers of necessary filter units, duplexers, diplexers, and the like. It would thus be desirable to provide a more flexible solution.

The object of the invention is to provide a circuit arrangement for compensation of the attenuation occurring in the signal paths between a transmitting and receiving device for wireless communication and an external antenna disposed separately from the transmitting and receiving device and utilized with this transmitting and receiving device, and this circuit arrangement will be suitable for different wireless standards and/or data transmission and thus can be adapted in a flexible manner as well as cost-effectively for different requirements.

The object is accomplished by a circuit arrangement with the features of the principal claim. Advantageous embodiments and enhancements of the invention are given by the subclaims.

For achieving the object, the circuit arrangement involves a circuit arrangement with multi-band capability. The circuit arrangement provides several receiving and transmitting branches, which are brought together in each case on the antenna side and on the device side. It consists of power amplifiers, receiving amplifiers, at least one splitter, at least one combining element (also designated a combiner below) and HF switching means designed for assuming different switching states for switching signal paths for transmission of speech or data signals between a transmitting and receiving device operated with the circuit arrangement and the antenna, by utilizing the above-named signal branches. Further, the circuit arrangement comprises a detector circuit for detecting a transmission signal emitted from the respective transmitting and receiving device and for providing control signals for actuating the above-named HF switching means as well as duplexers and frequency and/or band-pass filters. In this case, the circuit arrangement is designed so that in the base state of the circuit arrangement, the HF switching means assumes a switching state in which the transmitting and receiving device and the antenna are joined together via a receiving branch of the circuit arrangement. Further, the above-named components of the circuit arrangement are wired up and are brought to interact with each other, corresponding to the switching state of the HF switching means each time, so that when a transmission signal is first detected from the transmitting and receiving device that it operates, and for the subsequent duration of the existence of a speech or data connection to this transmitting and receiving device, the circuit arrangement assumes one of two operating modes, depending on the type of transmitting and receiving device and consequently the detected transmission signal. In this way, corresponding to one of the possible operating modes, the transmitting and receiving device and the antenna are connected together simultaneously via a receiving branch and a transmitting branch, which are brought to a duplex filter or duplexer in each case on the antenna side and on the device side. The circuit arrangement assumes this active operating mode as long as a transmission signal of a full duplex transmitting and receiving device or a transmitting and receiving device operating according to a transfer protocol with duplex operation is detected by its detector circuit.

Corresponding to another, non-duplex, active operating mode of the circuit arrangement according to the invention, when a transmission signal from the transmitting and receiving device is detected and for the duration of the existence of a connection to the transmitting and receiving device, the transmitting and receiving device and the antenna are joined together by alternating switching states of the HF switching means: in the presence of a transmission signal they are joined together via a transmitting branch of the circuit arrangement, and in the absence of a transmission signal, via a receiving branch. The HF switching means are thus controlled to assume these alternating switching states on the basis of corresponding control signals of the detector circuit.

According to the invention, the circuit arrangement is designed at least partially in a modular manner and consists of a universal front-end module with HF switching means disposed on the antenna side for switching the signal paths on the antenna side, a broadband receiving amplifier and at least one splitter dividing the output signal of the receiving amplifier into several outputs of the front-end module, as well as a universal back-end module with HF switching means which is disposed on the device side and which is coupled with the transmitting and receiving device via the detector circuit for switching the signal paths on the device side, at least one receiving amplifier and at least one combiner, bringing together the input signals of several inputs of the back-end module. The front-end and back-end modules are externally wired up with the other circuit components. These circuit components, i.e., the power amplifier, the duplexer, the frequency filter and/or the band-pass filter disposed between the splitter or one of the splitters of the front-end module and the combiner or one of the combiners of the back-end module, as well as the detector unit are thus designed and dimensioned corresponding to the respective application objective for the circuit arrangement and the frequency bandwidths and wireless standards supported by it in connection therewith. That is, the universal module, i.e., the front-end module and the back-end module can be combined and can be wired differently, each time depending on the application objective, with different power amplifiers and different frequency and/or band-pass filters, and they can also be operated with a transmission signal detector unit that is adapted each time to the transmitting and receiving devices that can be used with the circuit arrangement, corresponding to its concrete configuration. In this case, it is of advantage that the circuit components to be provided in a comparatively inexpensive way, even in the case of a possibly redundant arrangement or layout of its functional elements (therefore, in particular, the receiving amplifiers, splitters and combiners) are components of the universal modules, thus of the front-end and back-end modules, while the relatively more expensive frequency selection means such as frequency and band-pass filters, in particular, will be selected in order to avoid redundancies of these components, each time corresponding to the concrete requirements for wiring the universal modules. The unused connections of the front-end and the back-end modules are preferably sealed off each time with a grounded resistance.

Corresponding to advantageous enhancements, the circuit arrangement according to the invention is configured so that its other circuit components, in addition to the front-end module and the back-end module, are designed in modular form. Thus, according to one provided embodiment, the frequency filter and band-pass filter disposed in the receiving branches between the outputs of the front-end module and its splitter or one of its splitters and the inputs of the back-end module and its combiner or one of its combiners are combined into one module as a comb or matched filter. By means of the corresponding splitter in the front-end module and the selection means and filter disposed between its outputs and the input of the corresponding combiner in the back-end module, it is possible to filter specific required frequency bands and/or frequency ranges, namely those corresponding to the application objective in each case.

Independently of whether the filters are designed as individual units each time connected downstream or on the lead side to an output of the respective splitter or whether they are designed in modular form, they are optionally combined, as in the case of other circuit components, with attenuation elements or other units for adjusting the attenuation. The latter also applies, in particular, to the power amplifier, whose inputs can be wired to attenuation elements for fine-tuning to the concrete conditions in each case, i.e., to the attenuation that is established each time in the signal paths between the transmitting and receiving device and the external antenna. Due to this possibility for adjustment, when a configuration is present with comparatively little attenuation, when compared with configurations of other types, an over-controlling of the transmission signal through too high an amplification can be avoided and a signal with a defined level can be made available at the outputs of the transmission amplifier.

According to another advantageous embodiment of the invention, the circuit arrangement for creating the transmitting branches and the power amplifiers disposed therein comprises a corresponding amplifier module or a power amplifier module. The detector circuit is also designed in a modular construction corresponding to a provided enhancement of the invention, so that here also the circuit arrangement can be configured for operating different transmitting and receiving devices via a diversification into different detector modules that can be coupled with the back-end module.

As already stated, the circuit arrangement according to the invention affords the advantage that flexible and universally applicable front-end and back-end modules with a comparatively simple and cost-effective construction will be sufficient, but, depending on the application objective desired in each case, can be provided with a different external wiring that is more expensive with respect to the filter in individual cases, as opposed to these basic modules.

Taking into consideration the above statements, an embodiment of the invention is provided, which is configured for the alternative operation of transmitting and receiving devices operated according to the GSM-900, according to the GSM-1800 or according to the UMTS standard. Another embodiment is configured for the alternative operation of mobile wireless devices that operate corresponding to one of the currently known US wireless standards, namely the US-GSM-850, US-GSM-1900 or a CDMA standard, in one or both of the above-named frequency bands.

A most particularly advantageous embodiment of the circuit arrangement according to the invention is designed for the alternative operation of mobile transmitting and receiving devices, which operate according to the GSM-900- or the US-GSM/CDMA-850, the GSM-1800 or the US-GSM/CDMA-1900, the WLAN or the WiMAX standard. Therefore, it can be used for nearly all currently widespread wireless transmission standards in Europe or in the U.S.A. The HF switching means provided in the front-end module and in the back-end module can assume a corresponding number of different switching states for this purpose, whereby they assume the switching state required each time by controlling with a control signal provided by the detector circuit or a signal derived from such a control signal. The circuit arrangement is preferably designed so that corresponding control signals of the detector circuit are introduced into both the front-end module as well as the back-end module and a logic unit is disposed in each of the modules, and this logic unit derives the respective relevant switching signal in each case for the HF switching means from the control signals of the detector circuit.

As has already been presented initially, at least one splitter is disposed in the front-end module and at least one combiner is disposed in the back-end module. Corresponding to basic embodiments of the circuit arrangement, as they are given in the embodiment examples of FIGS. 1, 4, 6 and 7, which will be explained later, the arrangement of only one splitter in the front-end module and the arrangement of only one combiner in the back-end module is sufficient for solving the proposed object. In the case of these embodiments, all received signals transmitted via the receiving branches will be conducted through the corresponding splitter of the front-end module, the corresponding combining element of the back-end module, as well as through the frequency and/or band-pass filters disposed between the outputs of the splitter and the inputs of the combining element in the external wiring of the modules. This holds true independently of whether the received signals are received signals for a duplex transmitting and receiving device or according to a duplex transmission standard, or, however, received signals of a non-duplex transmission standard. According to a preferred embodiment of the circuit arrangement, however, two splitters are provided in the front-end module and two combining elements are provided in the back-end module. Further, in this case, an additional HF switching means is disposed in both the front-end module and in the back-end module, whereby the corresponding HF switching means is connected upstream or on the line side to the parallelly connected splitters in the front-end module, and the HF switching means is connected downstream or on the load side to the outputs of the parallelly connected combining elements in the back-end module. Just like the other HF switching means present also in the variants of the basic embodiment, both HF switching means are actuated by the detector circuit or by a logic unit converting its control signals. They are thus actuated in such a way that in the base state of the circuit arrangement, i.e., the circuit arrangement is ready for receiving any of the wireless signals that can be transmitted with it, all received signals transmitted over the receiving branches are conducted over the first splitter of the front-end module, the first combining element of the back-end module as well as via the frequency and/or band-pass filter(s) disposed in the external wiring between the outputs of the first splitter and the inputs of the first combining element.

However, as soon as a transmission signal of a transmitting and receiving device operated by the circuit arrangement is detected by the detector circuit for the first time, the HF switching means connected to the splitters in the front-end module and the HF switching means connected on the load side to the combining elements in the back-end module are switched over or reversed in each case, so that received signals of non-duplex wireless transmission standards are further transmitted via the first-named splitter, the frequency and/or band-pass filter(s) and the first-named combining element, but on the other hand, received signals of duplex wireless transmission standards are transmitted via the second splitter of the front-end module and from this splitter, are sent directly to the inputs of the second combining element in the back-end module, without filters connected in between, and finally, from the combining element via the receiving amplifier of the back-end module, the remaining HF switching means of the back-end module, as well as via the duplexer and the detector circuit, are introduced into the transmitting and receiving device. The omission of using the transmitting and/or band-pass filters, which are disposed between the front-end module and the back-end module, for the duplex channels, is possible due to the fact that that the duplexers disposed in the input region of the front-end module and in the output region of the back-end module in the external wiring already have a corresponding selective filtering effect. Simultaneously, by omitting this, the additional attenuation of the received signal that would otherwise occur, of course, in conducting the received signals over the frequency and/or band-pass filter(s) disposed between the front-end module and the back-end module, is avoided. On the other hand, however, in the base state of the circuit arrangement, it is indispensable to also conduct received signals of the duplex transmission standard over the first splitter of the front-end module, the first combining element of the back-end module and over the frequency and/or band-pass filter(s) disposed between them, since, of course, it is not known at first which type of transmitting and receiving device is operated with the circuit arrangement and whether received signals which are input to this device for building a connection are signals of a duplex or a non-duplex transmission standard. In the described enhancement of the circuit arrangement with a second splitter in the front-end module and a second combining element in the back-end module, adjustable attenuation elements can also be disposed between the corresponding second splitter and the corresponding second combining element, in order to adjust the level of the received signals of the duplex transmission standard that is optimal for the receiving amplifier of the back-end module corresponding to the attenuation ratios actually established in the incorporation of the circuit arrangement. Corresponding attenuation elements can be provided for the received signals of non-duplex transmission standards, thus in the other receiving branches conducted via the first splitter of the front-end module, the frequency and band-pass filters between the front-end module and the back-end module, as well as via the first combining element of the back-end module, as a component of the above-named frequency and band-pass filters or a corresponding module. A similar situation applies to the basic form of the circuit arrangement according to the principal claim. By means of the attenuation elements that can be adjusted with respect to attenuation, one can avoid the circumstance that the received signals are over-controlled or the noise component contained in them is unnecessarily also amplified.

The last-described embodiment with two splitters and two combining elements, and also the basic embodiment according to the principal claim can be enhanced by disposing in the back-end module, instead of only one receiving amplifier, several receiving amplifiers, i.e., one receiving amplifier per frequency band and/or transmission standard that can be used with the circuit arrangement, and these are integrated in the combining element or elements.

Corresponding to one possible embodiment of the invention, the outputs of power amplifiers to transmitting branches, which are used exclusively for the transmission of CDMA-based transmission signals, are wired up with an insulator or circulator. In this way, the corresponding insulator/circulator is disposed between the output of the respective power amplifier and a duplexer connected to the latter on the load side. Further, the outputs of individual power amplifiers are preferably wired up with blocking filters for blocking harmonics of the respective transmission signal.

The invention is particularly advantageously designed in such a way that the control signals of the detector circuit are also introduced into the power amplifiers or a power amplifier module and with their help, power amplifiers that are not directly necessary are completely turned off or at least the HF is turned off.

Figure 2:
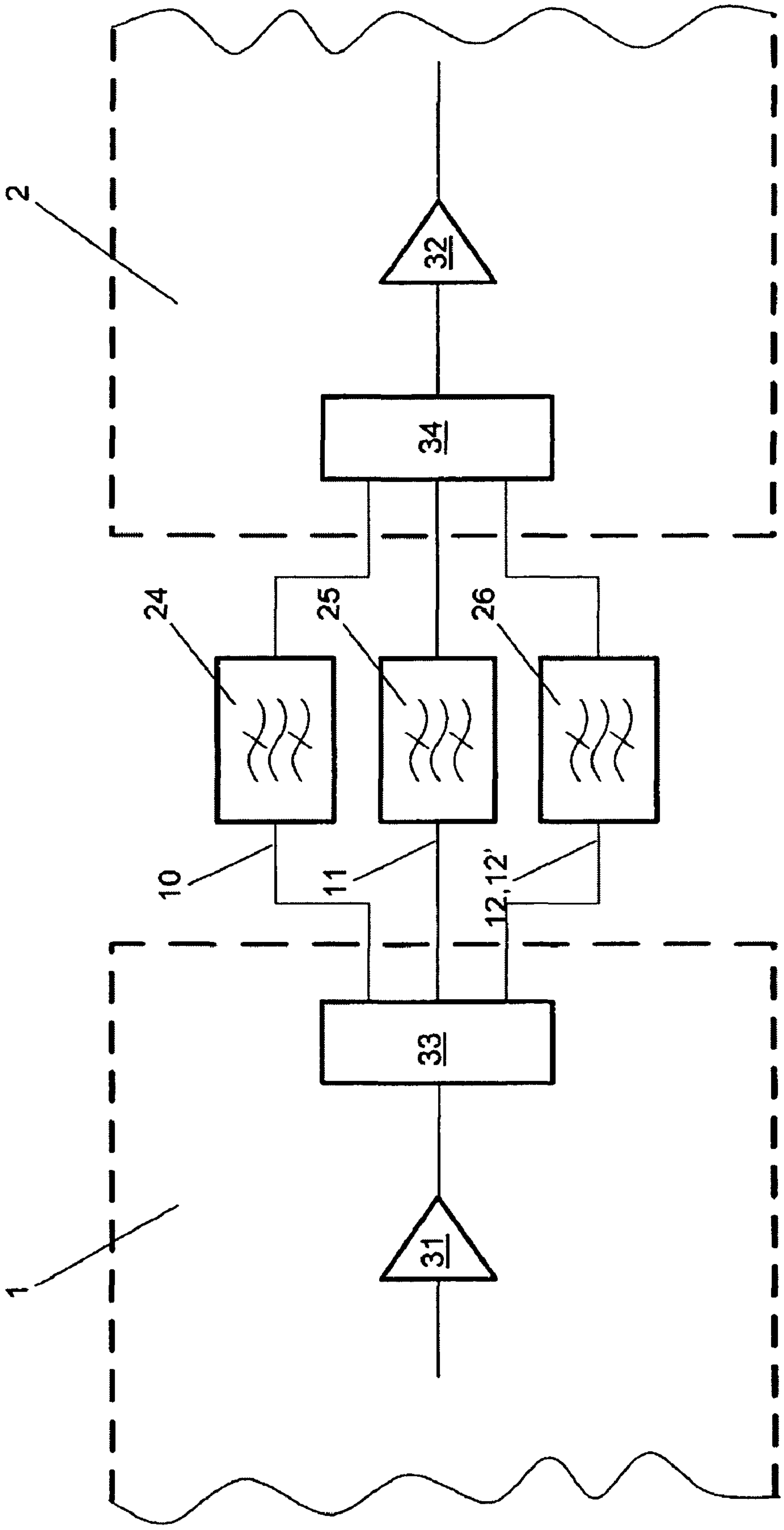
Figure 3:
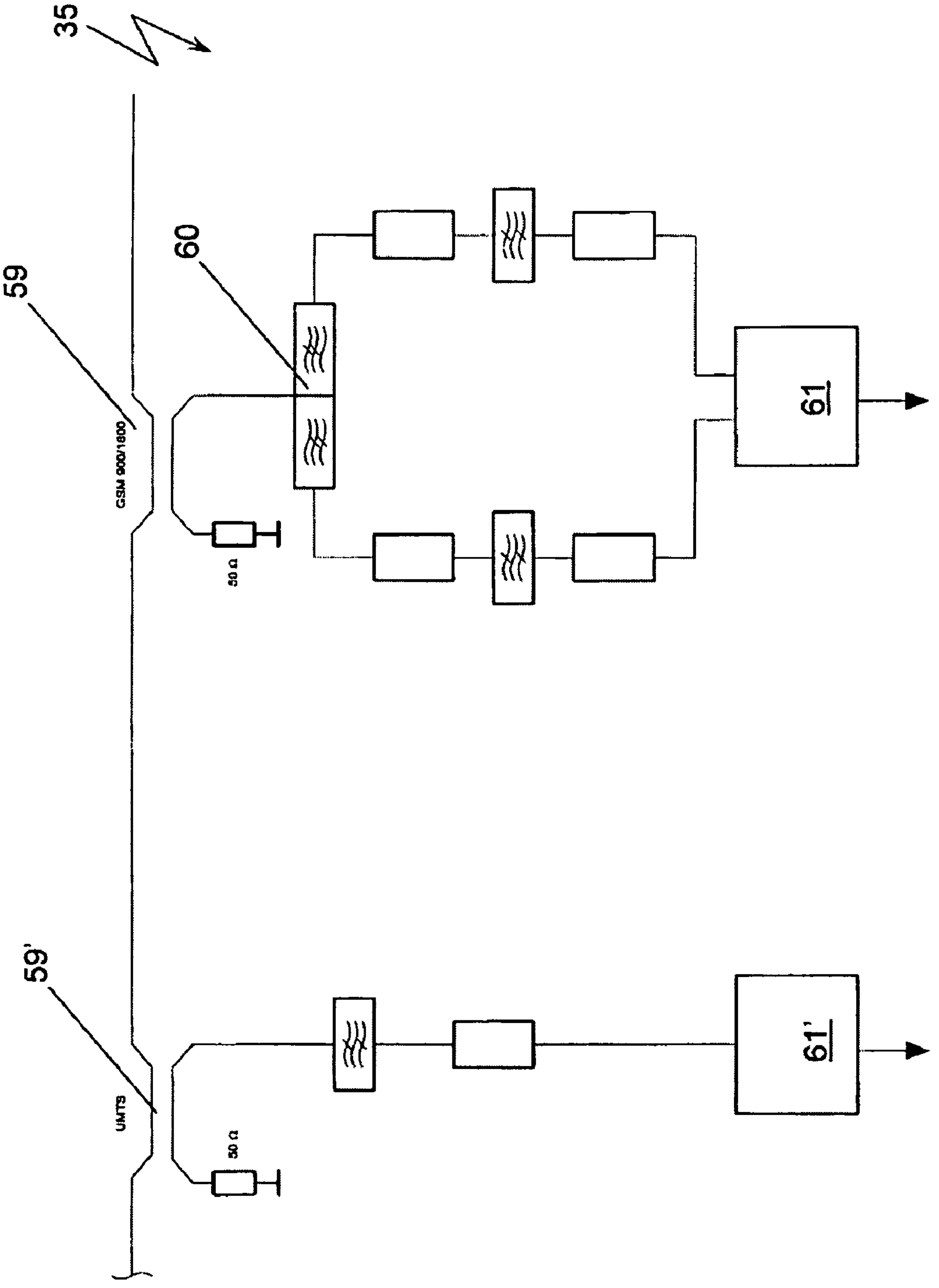
Figure 4:
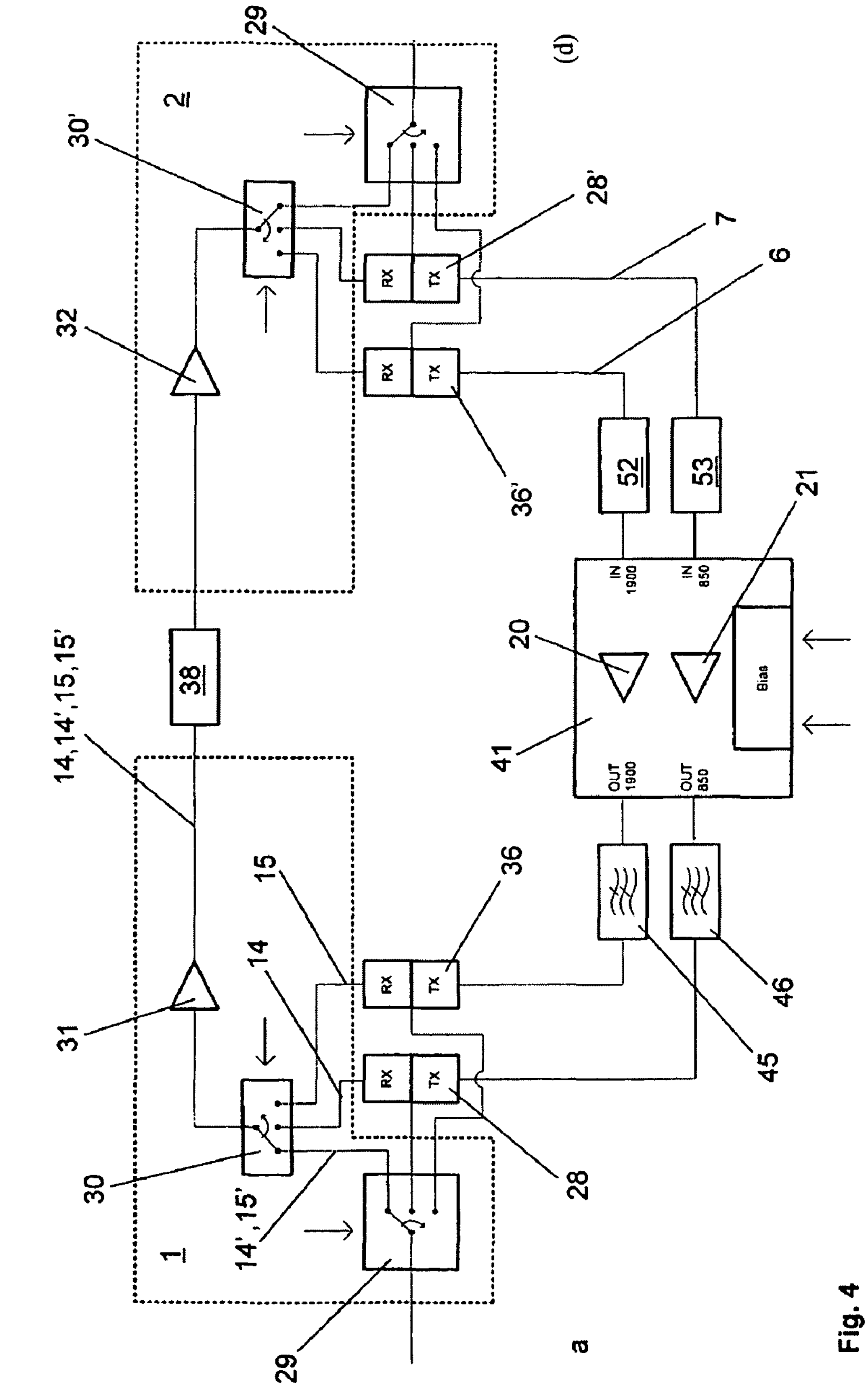
Figure 5:
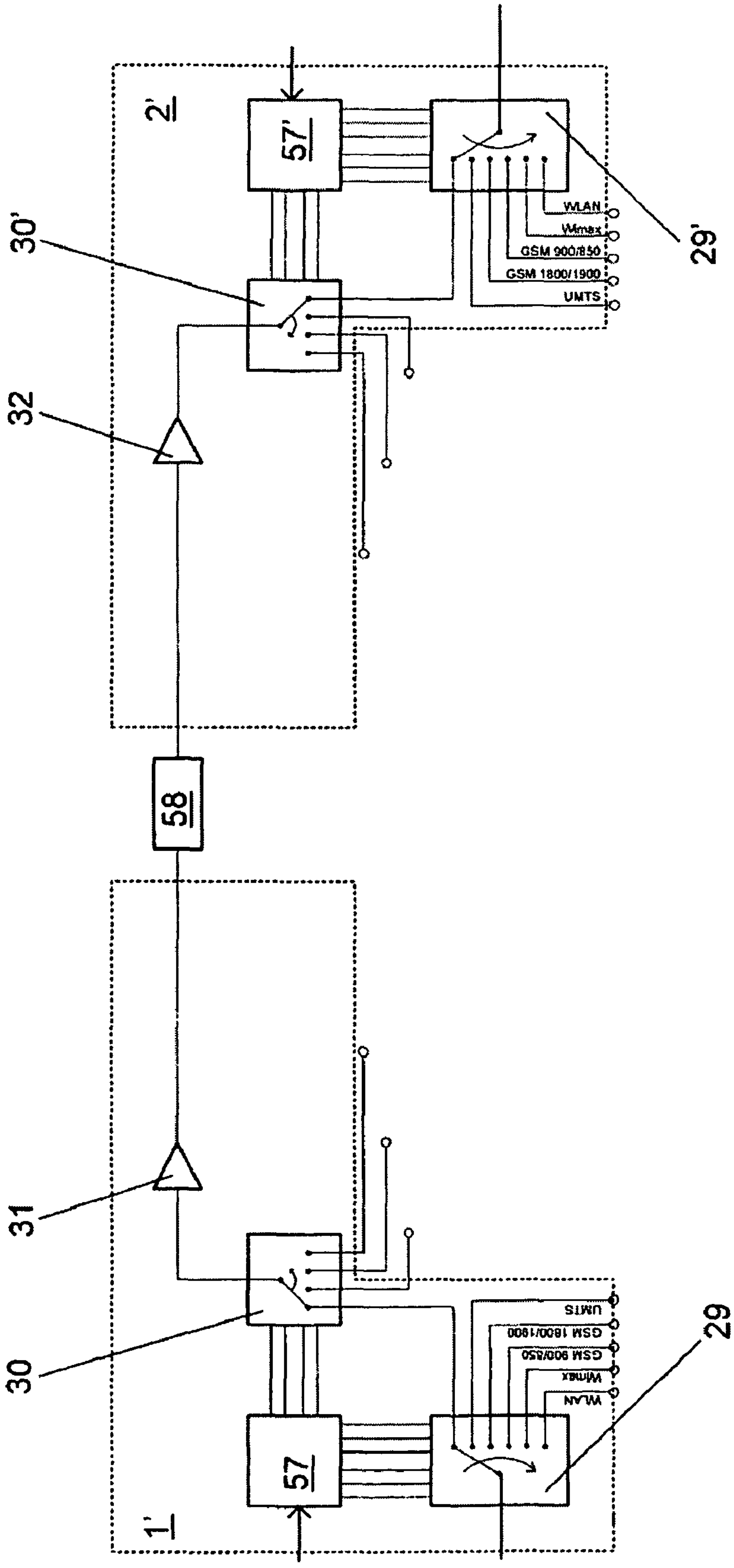
Figure 6:
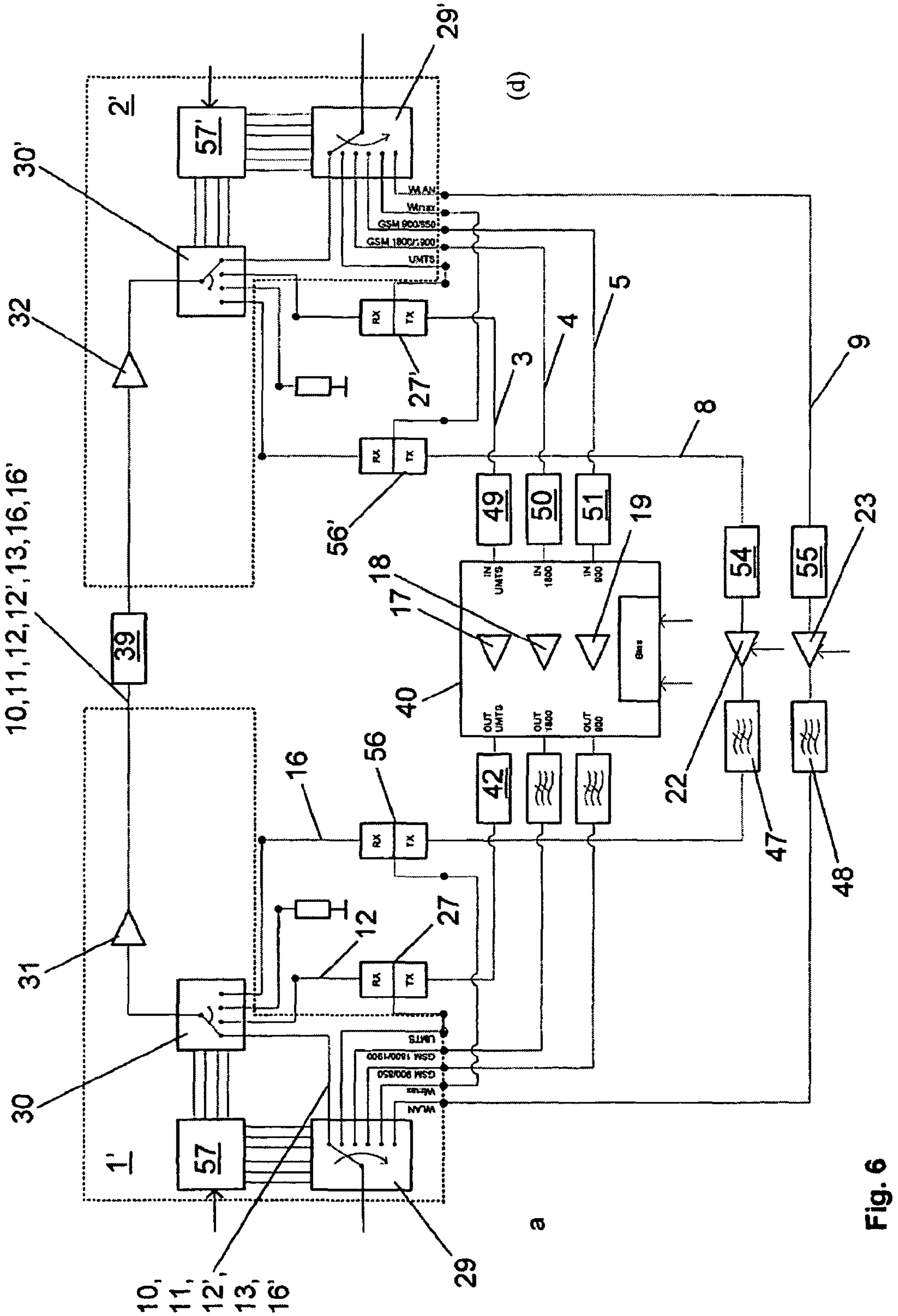
Figure 7:
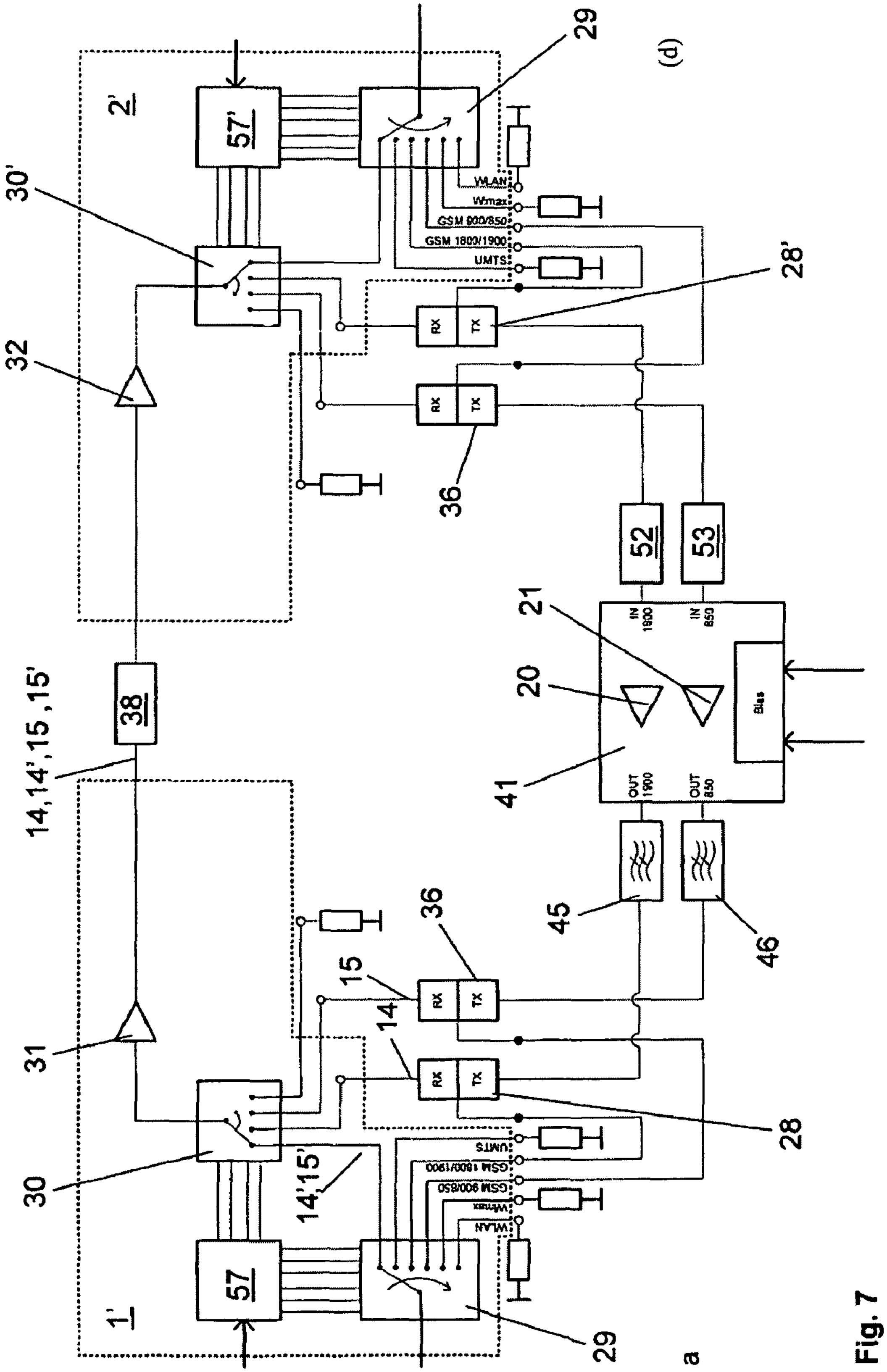
Figure 8:
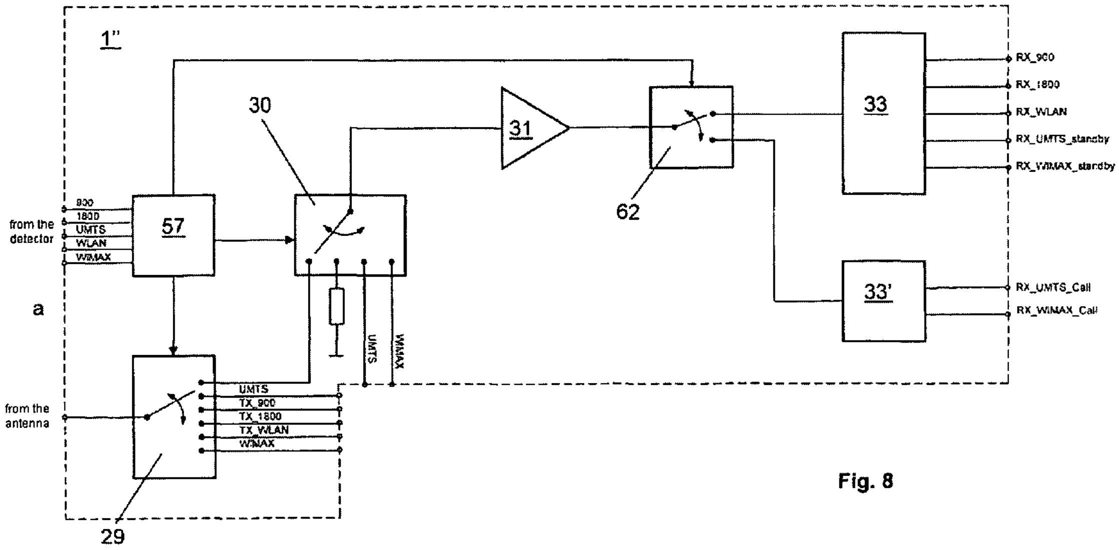

The invention will be explained in more detail below on the basis of embodiment examples. The following are shown in the appended drawings:

FIG. 1: A possible embodiment of the circuit arrangement according to the invention;

FIG. 2: The region of the transition between the front-end module and the back-end module in the embodiment according to FIG. 1;

FIG. 3: The detector circuit of the embodiment according to FIG. 1;

FIG. 4: Another possible embodiment of the circuit arrangement according to the invention;

FIG. 5: The front-end module and the back-end module of a particularly universal embodiment of the circuit arrangement according to the invention;

FIG. 6: A possible wiring of the front-end module and the back-end module according to FIG. 5;

FIG. 7: Another possibility for wiring the modules according to FIG. 5;

FIG. 8 A variant of the front-end module with two splitters in the output region; [and]

Figure 9:
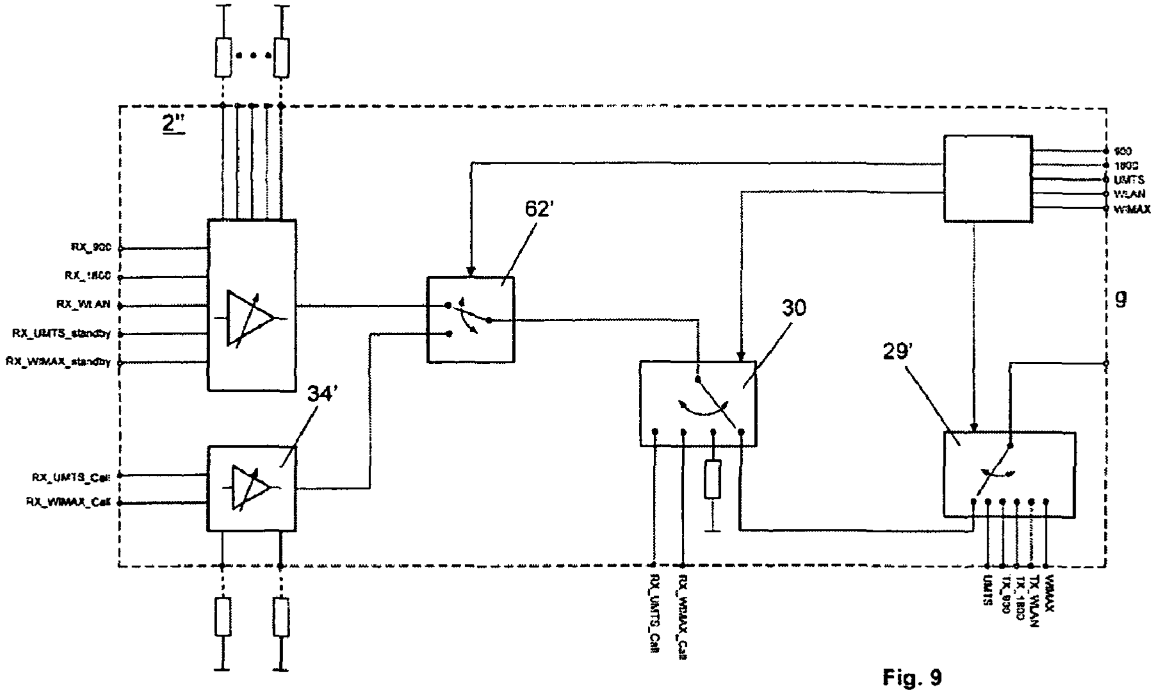

FIG. 9 A variant of the back-end module with two combining elements or combiners in the input region.

FIG. 1 shows the block diagram of a possible embodiment of the circuit arrangement according to the invention. The circuit arrangement is modular and consequently constructed of multiple parts. It consists essentially of a front-end module 1 disposed on the antenna side (a), a back-end module 1* disposed on the device side (d), frequency and/or band-pass filters 24, 25, 26, assembled and present in a module 37 between the front-end module 1 and the back-end module 2, a detector circuit 35, a power amplifier module 40 with power amplifiers 17, 18, 19 and attenuation elements 49, 50, 51 connected on the line side, and additional filters disposed between the front-end module 1 and the back-end module 2 as well as filters such as harmonic filters 43, 44, 45, 46, 47, 48 disposed in the power amplifier module 40 on the output side and on the input side. According to the invention, the front-end module 1 consists of HF switching means 29, 30, which are switched by control signals of detector circuit 35, a broadband receiving amplifier 31 and a splitter 33, which is not shown in FIG. 1 (for this, see FIG. 2). It is disposed on the antenna side (a) and is connected to an external antenna directly via an HF cable, by means of which mobile wireless devices operating with the circuit arrangement and not shown in the figure, receive and transmit HF signals. Back-end module 2 also consists of HF switching means 29', 30' actuated by detector circuit 35, as well as a receiving amplifier 32, which is also broadband in this case, and in addition, comprises a combiner 34 in its input region (see also FIG. 2 for this). It is connected to a mobile wireless device, which can be operated with the circuit and which is not shown in the figure, via the detector circuit 35 and an HF cable or a coupler (inductive or capacitive coupler). The outputs of front-end module 1 and the inputs of back-end module 2 are presented in the block diagram of FIG. 1, each time as an output or input. A detailed representation of the output region of the front-end module 1 as well as the input region of back-end module 2 is given in FIG. 2.

Several receiving branches 10, 11, 12, 12' are formed between the antenna and a mobile wireless device operated with the circuit arrangement, through the HF switching means 29, 30 of front-end module 1, the broadband receiving amplifier 31 thereof and its splitter 33, which can be connected to one another as a function of the respective switching state, the filters 24, 25, 26, disposed between the front-end module 1 and the back-end module 2, the combiner 34 and the receiving amplifier 32 of back-end module 2 and HF switching means 29', 30' thereof that also can be connected to one another as a function of the switching state, as well as detector circuit 35 that is transparent for received signals. Further, several transmitting branches 3, 4, 5 are formed by the circuit arrangement via the power amplifier module 40 with the attenuation elements 49, 50, 51 connected on the line side and the filters and attenuation elements 43, 44, 49, 50, 51 disposed between the power amplifier module 40 and the front-end module 1 and the back-end module 2.

The circuit arrangement shown by way of example is designed for the alternative operation of mobile wireless devices which operate either according to the GSM-900, the DCS or the GSM-1800 standard or, however, according to the UMTS standard. In the basic switching state shown, the receiving branches 10, 11, 12' of the circuit arrangement, which are guided via the receiving amplifiers 31, 32 of front-end module 1 and back-end module 2, are actively switched. The HF switching means 29, 29', 30, 30' in front-end module 1 and in back-end module 2 have a corresponding switching state. Now, as long as a transmission signal emitted from a connected mobile wireless device is detected by detector circuit 35, the HF switching means 29, 29', 30, 30' in front-end module 1 and in back-end module 2 are changed in their switching state by corresponding control signals of detector circuit 35.

As long as the detected transmission signal is a UMTS signal, the circuit arrangement assumes an operating mode subsequently for the duration of the existence of a connection to this mobile wireless device, in which the mobile wireless device is connected to the antenna simultaneously via the receiving branch 12 and the transmitting branch 3. The receiving branch 12 and the transmitting branch 3 are brought together both on the antenna side (a) as well as also on the device side (d) at a duplex filter or duplexer 27, 27'. A full duplex operation is thereby made possible, corresponding to the specifications of the UMTS standard, for a mobile wireless device, which is not shown but which is operated with the circuit arrangement. However, if the transmission signal detected by the detector circuit involves the transmission signal of a mobile wireless device operating according to the GSM standard, then the circuit arrangement is converted into an operating mode, in which the HF switching means in the front-end module 1 and in the back-end module 2, corresponding to the time slot control of the GSM standard, are switched by corresponding control signals of detector circuit 35 alternately for conducting the signals via the relevant receiving branch 10, 11 corresponding to the frequency band used and the transmitting branch 4, 5 corresponding to this. This means that as long as there is a connection to the corresponding mobile wireless device, when a transmission signal of the mobile wireless device that is recognized by detector circuit 35 is present, the corresponding transmitting branch 4, 5 is activated by switching the HF switching means 29, 29', 30, 30', and when the transmission signal is absent, there is a switching to the respective receiving branch 10, 11. Since a duplex operation is not present here, the corresponding receiving and transmitting branches 10, 11, 4, 5 need not be brought together at duplexers 27, 27', as is necessary for UMTS operation. The attenuation elements 49, 50, 51 upstream or on the line side of power amplifier module 40 serve for adapting the inputs of amplifier module 40 to the attenuation established in each case in the signal paths between the transmitting and receiving device and the external antenna. This is necessary in order to provide an output signal with a defined level in each case at the outputs of power amplifiers 17, 18, 19 for a known amplification.

In the example shown in FIG. 1, harmonic filters 43, 44 are connected on the load side to the outputs of power amplifiers 18, 19 for the GSM transmitting branch, in order to suppress harmonics. A so-called isolator or circulator 42 is connected on the load side to power amplifier 17 of UMTS transmitting branch 3, which reliably prevents received signals that may reach transmitting branch 3 via the duplex filter 27 from being conducted to the output of power amplifier 17 of the UMTS branch.

FIG. 2 shows parts of the front-end and back-end modules 1, 2, specifically the output region of the front-end module 1 and the input region of the back-end module 2, and the frequency or band-pass filters 24, 25, 26 disposed between the output of the front-end module 1 and the input of the back-end module 2 in the example of embodiment according to FIG. 1. Splitter 33 of front-end module 1 can be seen, for example, a bipolar transistor, which divides the output signal of the receiving amplifier of the front-end module, which is connected upstream to it and is not shown here, for which, for example, the three frequency or band-pass filters 24, 25, 26 are connected to the emitter of the bipolar transistor, each time via a 50-Ohm resistance (not shown here). The original common receiving branch 10, 11, 12, 12' up to the output of receiving amplifier 31 of front-end module 1 for GSM-900, GSM-1800 and UMTS signals, in the region of the transition to the back-end module 2, is hereby divided into three receiving branches 10, 11 and 12 or 12', thus a receiving branch for each of the three mobile wireless standards to be used with the circuit arrangement according to the invention. The frequency or band-pass filters 24, 25, 26 or band passes between the front-end module 1 and the back-end module 2 consequently always only permit received signals within the respective frequency band. In this case, the three frequency or band-pass filters 24, 25, 26 preferably are also disposed in a common filter module 37, a so-called comb filter. The receiving branches 10, 11, 12, 12' transmitting a respective received signal in a frequency-selective manner based on filters 24, 25, 26 between the front-end module 1 and the back-end module 2 are brought together again in the input region of the back-end module 2 by the combiner 34 disposed here. Accordingly, the respective input signal is amplified once more by receiving amplifier 32 connected downstream to the combiner or combining element 34, in order to again equilibrate the attenuation caused by the circuit arrangement itself, namely the attenuation caused by its circuit components, such as frequency or band-pass filters 24, 25, 26, which are disposed upstream of the receiving amplifier 32 relative to received signals.

As has already been shown earlier, instead of splitter 33, two splitters 33, 33' can be disposed in a front-end module 1" formed according to FIG. 8, and instead of one combining element 34, two combining elements 34, 34' can be provided in a back-end module 2" according to FIG. 9. As can be seen from FIG. 8, in this case, an additional HF switching means 62, which is activated by the signal of detector circuit 35, is also disposed between receiving amplifier 31 and the two splitters 33, 33' of front-end module 1", by which means it is possible to switch the receiving path back and forth between the two splitters 33, 33'. Likewise, an additional HF switching means 62' is provided between the combining elements 34, 34' of back-end module 2" according to FIG. 9 and receiving amplifier 32, in order to switch back and forth between the outputs of combining elements 34, 34'. In this case, the outputs of splitter 33' in front-end module 1" according to FIG. 8 are directly connected, i.e., without intermediate connection of frequency and/or band-pass filters 24, 25, 26, with the inputs of one of the combining elements 34' in back-end module 2", but they may optionally have an intermediate connection of attenuation elements for adjusting the input level for the one or more receiving amplifiers in back-end module 2" according to FIG. 9. After the first detection of a transmission signal, the received signals specific for a mobile wireless device operating according to a duplex transmission standard and driven with the circuit arrangement are thus transmitted via the corresponding receiving branches with splitter 33' and combining element 34' as long as a connection exists to the respective mobile wireless device.

As an example, FIG. 3 shows the detector circuit 35 connected on the line side, specifically the device side (d) relative to the back-end module 2, with respect to transmission signals of a mobile wireless device operated with the circuit arrangement. It may also involve just one module. In this case, a corresponding transmission signal emitted from the mobile wireless device is supplied by line coupler 59, 59'. Detector circuit 35 provides a line coupler 59' for UMTS transmission signals and a line coupler 59 for GSM-900/1800 transmission signals. The transmission signals according to the GSM standard relative to the respective frequency band are differentiated by a filter unit, a so-called diplexer 60. Different control signals are generated and output via logic units 61, 61' shown below in the figure, depending on the type of transmission signal detected in each case, and these signals are introduced into the HF switching means 29, 29', 30, 30' in the front-end module 1 and in the back-end module 2 in the way shown in FIG. 1. The correct switching branch each time is actively switched in the connection between the antenna and the mobile wireless device, thus as a signal path, by HF switching means 29, 29', 30, 30', based on these control signals.

FIG. 4 shows another example of embodiment of the circuit arrangement according to the invention, which is designed for operation with mobile wireless devices, which alternatively operate according to one of the two US-GSM mobile wireless standards or according to a CDMA standard set in the same frequency range. The front-end module 1 and the back-end module 2 are in turn connected to a power amplifier module 41 via duplexers 28, 28', 36, 36', attenuation elements 52, 53 and filters 45, 46. The four duplexers 28, 28', 36, 36' provided in the circuit arrangement, in this case, could be omitted, as long as the circuit arrangement were provided only for operation with mobile wireless devices according to the US-GSM standards. However, if full duplex CDMA devices will also be operated with the circuit arrangement, the named duplexers 28, 28', 36, 36' are necessary. In addition, a more detailed explanation of the power amplifier module 41 will be omitted for this example. It shall only be pointed out that, just as in the embodiment according to FIG. 1, the power amplifiers 20, 21 are preferably taken out of HF operation, based on control signals that are introduced to them from the detector circuit 35, which is not shown here, when a transmission signal of the mobile wireless device operating with the circuit arrangement is absent. This design is offered particularly for operation according to the time-slot-controlled GSM method of operating mobile wireless devices.

FIG. 5 shows the front-end module 1' and the back-end module 2' for a highly universally applicable embodiment of the circuit arrangement according to the invention. As can be recognized by the labeling, this can be configured for operation with mobile wireless devices operating according to the European GSM or DCS standards, operation by UMTS devices, operation of mobile wireless devices operating according to the US-GSM standards or operation by mobile wireless devices operating according to CDMA standards used in the USA, as well as operation for WLAN-capable and/or WiMAX-capable transmitting and receiving units. Which of the devices can actually be operated each time with this circuit arrangement therefore only depends on the external wiring of the front-end and back-end modules 1', 2', thus among other things, on the selection of module 58 with corresponding frequency or band-pass filters connected between splitter 33, which is not shown, of front-end module 1' and combiner 34, which is also not shown, of back-end module 2', but also on the power amplifiers that are used. This external wiring can also be constructed as partially modular, as indicated by filter module 58 and shown previously in the aforementioned examples. Thus, FIG. 6 shows an external wiring of the module shown in FIG. 5 (front-end module and back-end module) with which the circuit arrangement is suitable for the alternate operation of GSM-900, GSM-1800, UMTS, WiMAX or WLAN devices. Unused connections of the front-end module 1' or back-end module 2' or their HF switching means 29, 29', 30, 30' are grounded with a resistance, as can be seen from the figure.

The front-end module 1' and the back-end module 2' shown in FIG. 5 can also be provided with an external wiring according to FIG. 7, however, and so are configured for use with mobile wireless devices according to the two US-GSM standards and the CDMA mobile wireless standards used in the USA. Here also, the unused connections of front-end module 1' and of back-end module 2' are grounded via resistances. The front-end module according to FIG. 8 and the back-end module according to FIG. 9 are likewise universally applicable. In the case of the embodiments according to FIGS. 5 to 9, the HF switching means 29, 29', 30, 30' are not directly actuated by the output signal of detector circuit 35, but by logic units 57, 57' controlled by it and each disposed in front-end module 1' and in back-end module 2', these logic units converting the output signal of detector circuit 35.

LIST OF REFERENCE NUMBERS USED

1, 1', 1" Front-end module
2, 2', 2" Back-end module
3-9 Transmitting branch
10-16 Receiving branch
17-23 Power or transmission amplifiers
24, 25, 26 Frequency and/or band-pass filter
27, 27' Duplexer
28, 28' Duplexer
28, 29' HF switching means
30, 30' HF switching means
31, 32 Receiving amplifier
33 Splitter
34 Combining element or combiner
35 Detector circuit
36, 36' Duplexer
37, 38, 39 Comb-filter module
40, 41 Amplifier module
42 Isolator or circulator
43-48 Harmonic filter
49-55 Attenuation element
56, 56' Duplexer
57, 57' (Switching) logic unit
58 Filter module
59, 59' Line coupler
60 Diplexer
61, 61' (Switching) logic unit
62, 62' HF switching means

The invention claimed is:

1. A multi-band circuit arrangement for compensation of the attenuation occurring in signal paths between a transmitting and receiving device for wireless communication and an external antenna separately disposed from the transmitting and receiving device and utilized with this transmitting and receiving device, having several transmitting branches and receiving branches on the antenna side and device side and at least consisting of power amplifiers, receiving amplifiers, HF switching means, at least one splitter, at least one combining element, a detector circuit for the detection of transmission signals of the transmitting and receiving device and for controlling the HF switching means as well as duplexers and frequency and/or band-pass filters, whereby the above-named circuit components are wired up and interact with one another corresponding to the respective switching state of HF switching means, so that the transmitting and receiving device as well as the external antenna are connected with one another in a base state of the circuit arrangement via their receiving branches, whereas when a transmission signal is first detected from the transmitting and receiving device and for the subsequent duration of the presence of a speech or data connection to the transmitting and receiving device either simultaneously via a receiving branch and a transmitting branch brought together with the latter on the antenna side and on the device side, in each case at a duplexer, or when a transmission signal is present, they are joined together via a transmitting branch, and when a transmission signal is not present, via a receiving branch is hereby characterized in that the circuit arrangement is designed at least partially in a modular manner and consists of a universal front-end module with HF switching means disposed on the antenna side for switching the signal paths on the antenna side, a broadband receiving amplifier and the at least one splitter that divides the output signal of the receiving amplifier into several outputs of the front-end module as well as a universal back-end module with HF switching means which is disposed on the device side and which is coupled with the transmitting and receiving device via the detector circuit for switching the signal paths on the device side, at least one receiving amplifier and the at least one combining element bringing together the input signals of several inputs of the back-end module, wherein the front-end and the back-end modules are wired up externally with the other circuit components, namely the power amplifiers, the duplexers, the frequency and/or band-pass filters disposed between the splitter of the front-end module and the combining element of the back-end module as well as the detector unit, which are designed and dimensioned corresponding to the respective application objective of the circuit arrangement as well as the frequency band regions and wireless standards to be supported by this circuit.

2. The circuit arrangement according to claim 1, further characterized in that the band-pass filters disposed between the splitter of the front-end module and the combining element of the back-end module are assembled in a comb-filter module.

3. The circuit arrangement according to claim 1, further characterized in that at least several of the power amplifiers of the transmitting branches are assembled in an amplifier module.

4. The circuit arrangement according to claim 1, further characterized in that the detector circuit is constructed as a module with several detectors for detecting transmission signals of different frequency bands.

5. The circuit arrangement according to claim 1, further characterized in that the unused connections of the front-end and the back-end modules are grounded each time with a resistance.

6. The circuit arrangement according to claim 1, further characterized in that the arrangement can be configured for alternative operation with a mobile wireless device operating according to the GSM-900 standard, the GSM-1800 standard or the UMTS standard by a corresponding wiring of front-end module and back-end module.

7. The circuit arrangement according to claim 1, further characterized in that the arrangement can be configured for alternative operation with a mobile wireless device operating according to the US-GSM/CDMA-850 standard or the US-GSM/CDMA-1900 standard by a corresponding wiring of front-end module and back-end module.

8. The circuit arrangement according to claim 1, further characterized in that the arrangement can be configured for alternative operation with a transmitting and receiving device operating according to the GSM-900 standard or the US-GSM/CDMA-850 standard, the GSM-1800 standard or the US-GSM/CDMA-1900 standard, the UMTS standard, according to the WLAN standard or according to the WiMAX standard by a corresponding wiring of front-end module and back-end module.

9. The circuit arrangement according to claim 6, further characterized in that an isolator or circulator is connected on the load side to each power amplifier disposed in a transmitting branch for a CDMA transmitting signal.

10. The circuit arrangement according to claim 6, further characterized in that a harmonic filter is connected on the load side each time to the power amplifiers of the transmitting branches.

11. The circuit arrangement according to claim 6, further characterized in that an attenuation element is connected on the line side each time to the power amplifiers of the transmitting branches.

12. The circuit arrangement according to claim 1, further characterized in that a logic unit is disposed in each of front-end module and back-end module for actuating the HF switching means, which converts the control signals of detector circuit so that the HF switching means assume the switching state corresponding to the base state of the circuit or to a switching state corresponding to the recognized transmission signal in each case.

13. The circuit arrangement according to claim 1, further characterized in that two splitters and an additional HF switching means are disposed in parallel in the front-end module, and two combining elements and an additional HF switching means are disposed in parallel in the back-end module, whereby the additional HF switching means connected upstream to the splitters in the front-end module for branching between them, and the additional HF switching means connected downstream to the combining elements in the back-end module for alternating between their outputs are also actuated directly by the detector circuit or the logic units converting the optionally present control signals of the detector circuit, so that in the base state of the circuit arrangement, all receiving branches are conducted over the first splitter of front-end module, the first combining element of the back-end module and the frequency and/or band-pass filters disposed between them in the external wiring, but when a transmission signal is first detected, and for the duration of the presence of a speech or data connection to the transmitting and receiving device, only the transmitting branches of the non-duplex channels are conducted over the above-named circuit elements with the frequency and/or band-pass filters, whereas the receiving branches of the duplex channels are conducted via the second splitter of front-end module and from the outputs thereof, directly or only via additional attenuation elements, to the inputs of the second combining element in back-end module.

14. The circuit arrangement according to claim 1, further characterized in that several receiving amplifiers, namely one receiving amplifier per frequency band and/or transmission standard that can be used with the circuit arrangement are disposed in the back-end module, and these are integrated into the combining element or the combining elements.

15. The circuit arrangement according to 1, further characterized in that the power amplifiers disposed in transmitting branches are turned off completely or at least the HF is turned off when a transmission signal based on corresponding control signals of the detector circuit is absent.

* * * * *